(12) United States Patent
Graske et al.

(10) Patent No.: US 7,136,661 B2
(45) Date of Patent: Nov. 14, 2006

(54) WEATHER ALERT NOTIFICATION TO MOBILE STATION UPON WEATHER ALERT OCCURRENCE DURING A TIME PERIOD

(75) Inventors: Jerome W. Graske, St. Charles, IL (US); Gerald W. Pfleging, Batavia, IL (US); George Paul Wilkin, Bolingbrook, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 232 days.

(21) Appl. No.: 10/615,043

(22) Filed: Jul. 8, 2003

(65) Prior Publication Data

US 2005/0009508 A1    Jan. 13, 2005

(51) Int. Cl.
*H04Q 7/20* (2006.01)
(52) U.S. Cl. ............... 455/466; 455/414.3; 455/404.2
(58) Field of Classification Search ............ 455/466, 455/412.1, 412.2, 414.1, 414.2, 414.3
See application file for complete search history.

(56) References Cited

U.S. PATENT DOCUMENTS

| | | | |
|---|---|---|---|
| 6,329,904 B1* | 12/2001 | Lamb | 340/286.02 |
| 6,351,647 B1* | 2/2002 | Gustafsson | 455/466 |
| 6,560,456 B1* | 5/2003 | Lohtia et al. | 455/445 |
| 6,718,332 B1* | 4/2004 | Sitaraman et al. | 707/102 |
| 2002/0024536 A1* | 2/2002 | Kahan et al. | 345/745 |
| 2002/0077060 A1* | 6/2002 | Lehikoinen et al. | 455/41 |
| 2002/0095312 A1* | 7/2002 | Wheat | 705/1 |
| 2003/0006912 A1* | 1/2003 | Brescia | 340/990 |
| 2004/0059790 A1* | 3/2004 | Austin-Lane et al. | 709/207 |
| 2004/0239531 A1* | 12/2004 | Adamczyk | 340/995.13 |
| 2005/0027676 A1* | 2/2005 | Eichstaedt et al. | 707/1 |
| 2005/0076100 A1* | 4/2005 | Armstrong | 709/219 |

\* cited by examiner

*Primary Examiner*—Erika A. Gary

(57) ABSTRACT

A short message service request to receive one or more notifications of any one or more weather alerts that occur during a time period in one example is received from a mobile station. A notification of a weather alert, of the one or more notifications of the any one or more weather alerts, is sent to the mobile station upon an occurrence of the weather alert during the time period.

26 Claims, 4 Drawing Sheets

WEATHER ALERT NOTIFICATION TO MOBILE STATION UPON WEATHER ALERT OCCURRENCE DURING A TIME PERIOD

TECHNICAL FIELD

The invention relates generally to communications and more specifically to providing a notification of a weather alert to a mobile station.

BACKGROUND

A user of a mobile station desires to be informed, via the mobile station, of a weather alert issued by the National Weather Service ("NWS") or the National Oceanic and Atmospheric Administration ("NOAA"). One way to receive a notification of the weather alert is to subscribe to a weather alert notification service. Upon occurrence of the weather alert, the weather alert notification service sends the notification of the weather alert to the mobile station that subscribes to the weather alert notification service. The weather alert notification service allows the user of the mobile station to provide a schedule of times and locations to receive the notification of the weather alerts.

The weather alert notification service requires that the mobile station is subscribed to the weather alert notification service in order to receive the notification of the weather alert. For example, the user of the mobile station must be subscribed to the weather alert notification service prior to receiving the notification of the weather alert. As one shortcoming, users that do not subscribe to the weather alert notification service are prevented from receiving the notification of the weather alert. For example, the user of the mobile station is unable to receive the notification of the weather alert associated with the approach of threatening weather. It is inconvenient for the user to subscribe to the weather alert notification service if the user does not desire a continuous notification of weather alerts.

Thus, a need exists for a weather alert notification service that provides a notification of a weather alert to a mobile station without prior subscription to the weather alert notification service.

SUMMARY

The invention in one embodiment encompasses a method. A short message service request to receive one or more notifications of any one or more weather alerts that occur during a time period is received from a mobile station. A notification of a weather alert, of the one or more notifications of the any one or more weather alerts, is sent to the mobile station upon an occurrence of the weather alert during the time period.

Another embodiment of the invention encompasses an apparatus. The weather alert notification component registers the mobile station to receive the notification of the weather alert during the time period upon receipt of the short message service request from the mobile station. The weather alert notification component sends the notification of the weather alert to the mobile station upon the occurrence of the weather alert during the time period.

Yet another embodiment of the invention encompasses an article. The article comprises one or more computer-readable signal-bearing media. The article comprises means in the one or more media for receiving the short message service request from the mobile station to receive the one or more notifications of the any one or more weather alerts that occur during the time period. The article comprises means in the one or more media for sending the notification of the weather alert, of the one or more notifications of the any one or more weather alerts, to the mobile station upon the occurrence of the weather alert during the time period.

DESCRIPTION OF THE DRAWINGS

Features of exemplary implementations of the invention will become apparent from the description, the claims, and the accompanying drawings in which:

DETAILED DESCRIPTION

The particular values and configurations discussed in these non-limiting examples can be varied and are cited merely to illustrate an embodiment of the present invention and are not intended to limit the scope of the invention.

Figure 1:
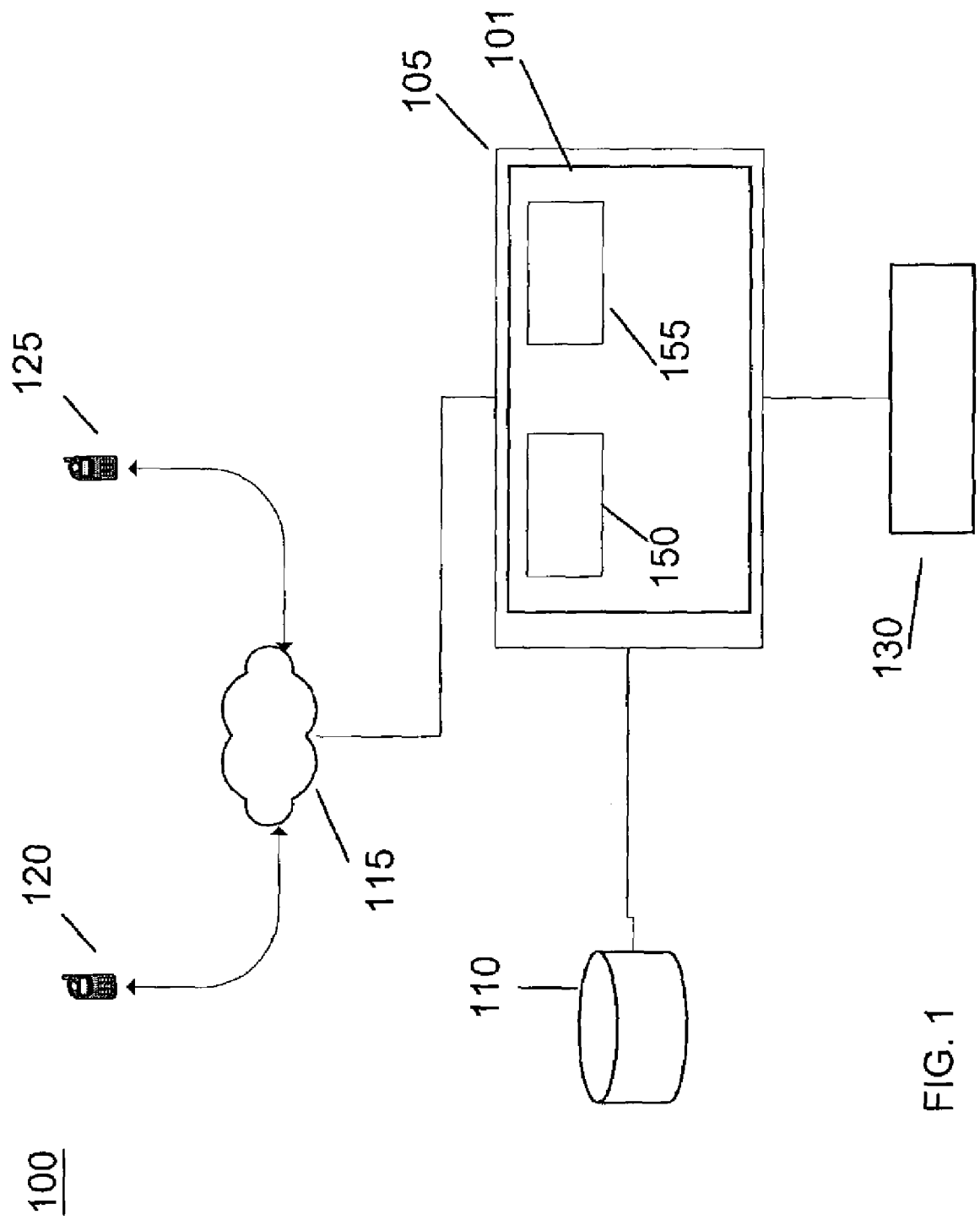
FIG. 1 is a representation of one exemplary implementation of an apparatus that comprises one or more weather alert notification components, one or more notification databases, one or more networks, one or more mobile stations, and one or more weather alert generators.

Referring to FIG. 1, an apparatus 100 in one example comprises one or more weather alert notification components 105, one or more notification databases 110, one or more networks 115, one or more mobile stations 120 and 125, and one or more weather alert generators 130.

The weather alert notification component 105 receives a weather alert from the weather alert generator 130. The weather alert notification component 105 communicates with the notification database 110 and the network 115 to send a notification of the weather alert to one or more of the mobile stations 120 and 125. The network 115 communicates with the weather alert notification component 105 and the mobile stations 120 and 125. For example, the network 115 communicatively couples the weather alert notification component 105 with the mobile stations 120 and 125.

The notification database 110 in one example comprises a Home Location Register ("HLR"). The notification database 110 comprises a primary or home location list of mobile stations 120 and 125. The notification database 110 comprises a list of features supported for each one of the mobile stations 120 and 125.

The network 115 comprises a public switched telephone network ("PSTN"). The mobile stations 120 and 125 comprise respective wireless devices. For example, the mobile stations 120 and 125 comprise one or more of such as analog cellular telephones, digital cellular telephones, wireless devices, such as a personal computers or personal digital assistants with a wireless modems, and/or wireless devices that support Short Messaging Service ("SMS") communications. For example, the mobile stations 120 and 125 comprise SMS enabled wireless devices and a means for establishing their respective location, such as a Global Positioning System ("GPS") capability.

The weather alert generator 130 comprises one or more of the National Weather Service ("NWS") systems listed at the NWS Office of Climate, Water, and Weather Services web site (http://www.nws.noaa.gov/om/disemsys.shtml#NOAAPORT). For example, the weather alert generator 130 comprises a NWS system such as one or more of the or the National Oceanic and Atmospheric Administration ("NOAA") Weather Radio ("NWR"), the NOAA Weather Wire Service ("NWWS"), and the NWS Home Page.

The weather alert notification component 105 comprises a messaging component. In one example, the messaging component comprises a voice mail system ("VMS"), such as an AnyPath® Messaging System offered by Lucent Technologies Inc., a registration component 150, and a locator component 155. The VMS provides conventional voice mail services for the mobile stations 120 and 125. The VMS also sends and receives SMS messages and parses the weather alert received from the weather alert generator 130. In another example, the messaging component comprises a plurality of computer systems connected to the network 115 that can send SMS messages, receive SMS messages, and parse the weather alert from the weather alert generator 130.

In one example, the weather alert notification component 105 sends the notification of the weather alert to the mobile station 120 if the mobile station is registered with the weather alert notification component 105. The registration component 150 manages a registration status of the mobile station 120 during a time period. Upon an occurrence of the weather alert, the weather alert notification component 105 sends the notification of the weather alert to the mobile station 120 if the mobile station 120 is registered during the time period. Upon the occurrence of the weather alert, the weather alert notification component 105 withholds the notification of the weather alert from the mobile station 125 if the mobile station 125 is unregistered during the time period.

In another example, the weather alert notification component 105 sends the notification of the weather alert to the mobile station 120 if a location of the mobile station 120 is within an area of the weather alert. Upon receipt of the weather alert, the weather alert notification component 105 employs the locator component 155 to determine the location of the mobile station 120 during the time period. Upon the occurrence of the weather alert, the weather alert notification component 105 sends the notification of the weather alert to the mobile station 120 if the location of the mobile station 120 is within an area associated with the weather alert during the time period. Upon the occurrence of the weather alert, the weather alert notification component 105 withholds the notification of the weather alert from the mobile station 125 if the location of the mobile station 125 is not within the area associated with the weather alert.

Figure 2:
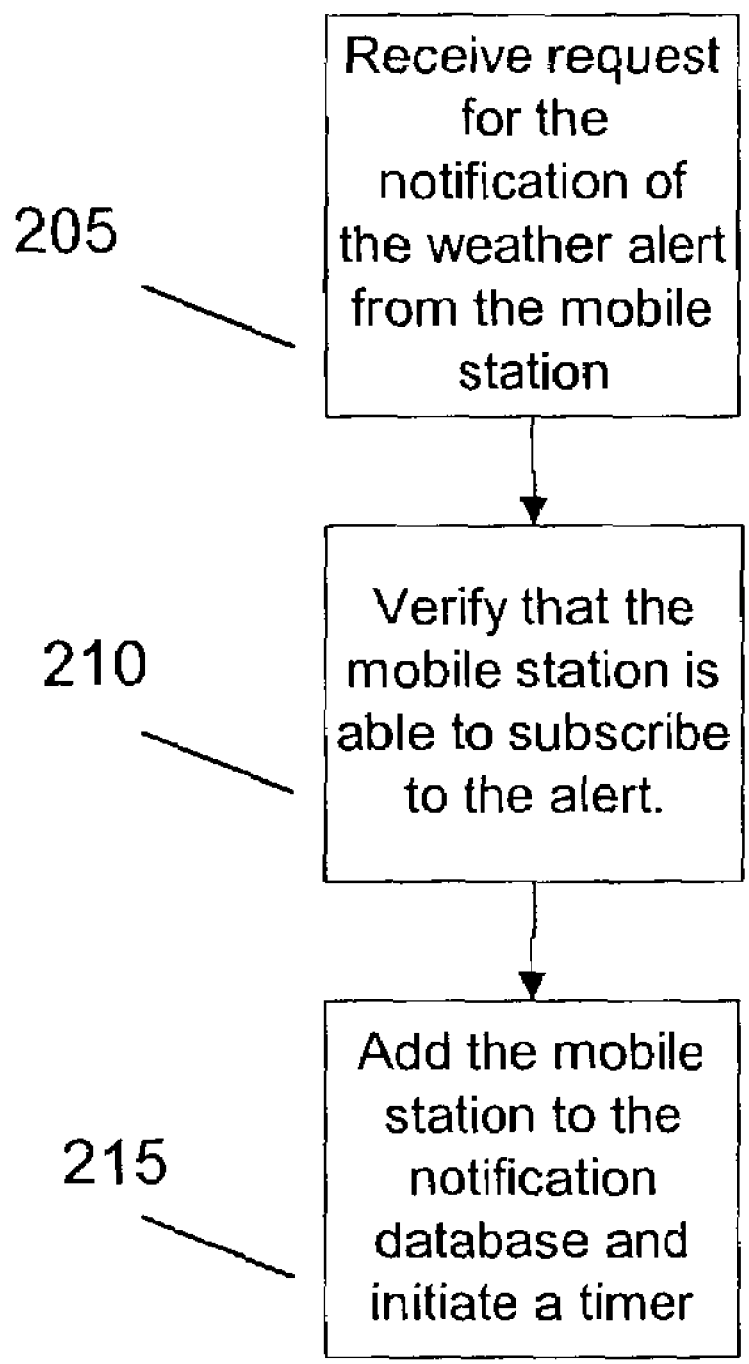
FIG. 2 is a representation of an exemplary process flow of a registration of a mobile station of the one or more mobile stations of the apparatus of FIG. 1.

Referring to FIG. 2, the weather alert notification component 105 registers the mobile station 120 for the time period. In STEP 205, the weather alert notification component 105 receives a request from the mobile station 120 to receive the notification of the weather alert that occurs during the time period. For example, the request comprises one or more of an SMS request, a website submission, or a call to a registration service code (e.g., #777), from the mobile station 120 to receive the notification of the weather alert that occurs during the time period. In STEP 210, the weather alert notification component 105 communicates with the notification database 110 to determine if the mobile station 120 is eligible to register to receive the notification of the weather alert. For example, the weather alert notification component 105 queries the notification database 110 to authenticate the mobile station 120. In one example, the weather alert notification component 105 determines whether the mobile station 120 is capable of sending and receiving one or more SMS messages. In another example, the weather alert notification component 105 determines whether that the weather alert feature is enabled for the mobile station 120.

In STEP 215, the weather alert notification component 105 registers the mobile station 120 for the time period. For example, the weather alert notification component 105 makes a notation in the notification database 110 to indicate that the mobile station 120 requests to receive the notification of the weather alert during the time period.

Referring to FIG. 1, the registration component 150 maintains a timer associated with the mobile station. Upon receipt of the SMS request from the mobile station 120, the registration component 150 initiates the timer to a expiration time indicating the time period during which the weather alert notification component 105 sends the notification of the weather alert to the mobile station 120. Upon the occurrence of the weather alert, the registration component 150 determines if the occurrence of the weather alert is during the time period. For example, the registration component 150 compares a time of the occurrence of the weather alert to the time period associated with the mobile station 120.

The registration component 150 serves to register the mobile station 120 upon receipt of the SMS request. The registration component 150 maintains a listing of the mobile stations 120 and 125 registered to receive the notification of the weather alert. The registration component 150 determines an expiration of the time period of the mobile station 120 from the timer of the mobile station 120. The expiration of the time period in one example occurs when the timer exceeds the time period. Upon the expiration of the time period, the registration component 150 unregisters the mobile station 120 in the listing. In another example, the registration component 150 polls the listing at given time intervals to unregister mobile stations that have exceeded the time period. For example, the registration component 150 polls the listing every four hours to unregister mobile stations that have exceeded the time period. The weather alert notification component 105 sends the notification of the weather alert to the mobile station 120 if the occurrence of the weather alert happens during the time period. Where a second weather alert occurs after the time period associated with the mobile station 120, the weather alert notification component 105 withholds a notification of the second weather alert from the mobile station 120.

The locator component 155 determines the location of the mobile station 120. In one example, upon receipt of the weather alert during the time period, the locator component 155 polls the mobile station 120 to determine the location of the mobile station 120.

In one example, the mobile station 120 comprises the GPS capability. The locator component 155 polls the mobile station 120 to retrieve the GPS position of the mobile station 120. In another example, the locator component 155 employs a triangulation, such as 911-triangulation, to determine the location of the mobile station 120, as will be understood by those skilled in the art. In yet another example, the locator component 155 comprises a Long Range Aid to Navigation ("LORAN") system to determine the location of the mobile station 120.

The locator component 155 monitors a locational movement of the mobile stations 120 and 125. In one example, the locator component 155 polls the mobile stations 120 and 125 at intervals to monitor the locational movement of the mobile stations 120 and 125 during the time period. The intervals in one example are defined by a service provider. For example, the locator component 155 polls the mobile station 120 every fifteen minutes to obtain a new location of the mobile station 120. The weather alert notification component 105 evaluates the new location of the mobile station 120 and sends a notification to the mobile station 120 for a weather alert previously sent for the new location, as will be illustrated later.

In another example, the locator component 155 polls the mobile stations 120 and 125 upon receipt of the weather alert from the weather alert generator 130. The locator component 155 polls the mobile stations 120 and 125 to obtain the new locations of the mobile stations 120 and 125, respectively, and sends the notification to one or more of either the mobile stations 120 and 125.

The weather alert in one example is associated with a Specific Area Message Encoding ("SAME") area, as will be understood by those skilled in the art. Upon receipt of the weather alert from the weather alert generator 130, the weather alert notification component 105 parses the weather alert to obtain the Specific Area Message Encoding area associated with the weather alert. The weather alert notification component 105 compares the Specific Area Message Encoding area to the location of the mobile station 120 upon the occurrence of the weather alert during the time period. The weather alert notification component 105 sends the notification of the weather alert to the mobile station 120 if the location of the mobile station 120 is within the Specific Area Message Encoding area associated with the weather alert.

The notification database 110 comprises a weather criteria profile for the mobile station 120. Upon receipt of the weather alert, the weather alert notification component 105 compares the weather alert to one or more criteria of the weather criteria profile. The mobile station 120 establishes the one or more criteria to indicate the weather alerts that the mobile station 120 requests to be notified. For example, the mobile station 120 establishes the weather criteria profile by indicating that the mobile station 120 requests to be notified of one or more specific weather alerts, for example, one or more weather alerts of tornado, hail, and/or severe thunderstorm warnings.

Upon receipt of the weather alert, the weather alert notification component 105 communicates with the notification database 110 to retrieve the weather criteria profile for the mobile station 120. The weather alert notification component 105 evaluates the weather criteria profile for the mobile station 120 and sends the notification of the weather alert to the mobile station 120 if the weather alert matches at least one of the one or more criteria. The weather alert notification component 105 withholds the notification of the weather alert if the weather alert fails to match the one criteria of the weather criteria profile for the mobile station 120.

The notification database 110 maintains a history of any weather alerts received by the weather alert notification component 105. When the mobile station 120 travels from the location to the new location, the weather alert notification component 105 evaluates the history to determine if a weather alert was previously issued for the new location of the mobile station 120.

For example, the mobile station 120 is located in a first location and the mobile station 125 is located in a second location. A weather alert has been issued for a new area. The second location is within the new area. The weather alert notification component 105 receives the weather alert, determines that the second location is within the new area, and sends the notification of the weather alert to the mobile station 125. The notification database 110 adds the weather alert for the new area to the history. The mobile station 120 moves from the first location to the second location. Upon entering the second location, the weather alert notification component 105 evaluates the history and determines that the weather alert was previously issued for the new area comprising the second location. The weather alert notification component 105 sends the notification of the weather alert that was previously issued for the new area to the mobile station 120.

Figure 3:
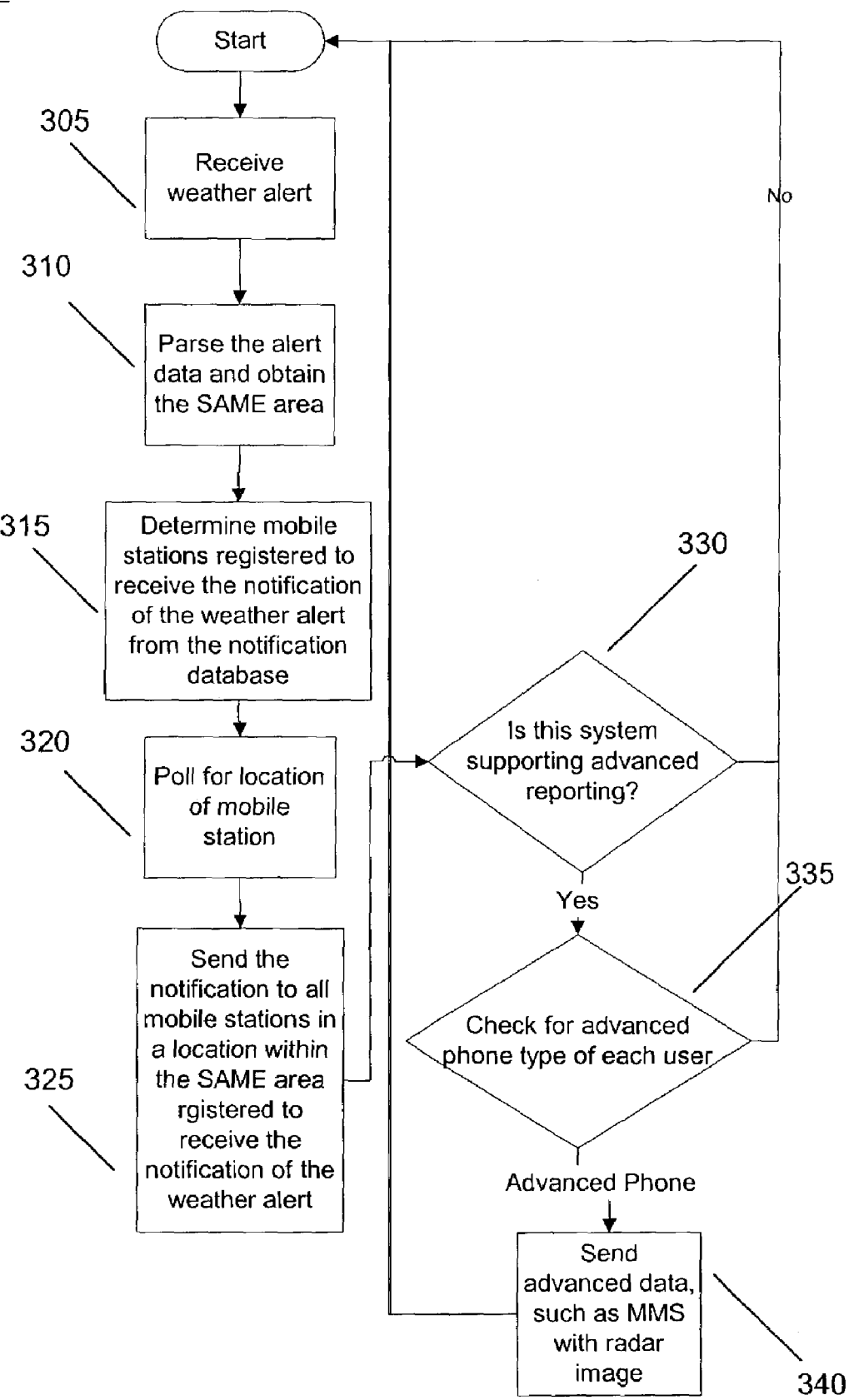
FIG. 3 is a representation of an exemplary process flow of an occurrence of a weather alert from a weather alert generator of the one or more weather alert generators of the apparatus of FIG. 1.

Referring to FIG. 3, the weather alert notification component 105 receives the weather alert and sends the notification of the weather alert to the mobile station. In STEP 305, the weather alert notification component 105 receives the weather alert issued by the weather alert generator 130. In STEP 310, the weather alert notification component 105 parses the weather alert to obtain the Specific Area Message Encoding area associated with the weather alert. In STEP 315, the weather alert notification component 105 determines the mobile stations that are registered to receive the notification of the weather alert.

In one example, the weather alert notification component 105 communicates with the notification database 110 to evaluate the respective weather criteria profiles for the mobile stations 120 and 125. The weather alert matches the one criteria of the weather criteria profile of the mobile station 120 and sends the notification of the weather alert in an SMS message to the mobile station 120. The weather alert notification component 105 withholds the notification of the weather alert from the mobile station 125 if the weather alert fails to match the one criteria of the weather criteria profile of the mobile station 125.

In another example, the government requires that upon receipt of any weather alert a notification of the any weather alert is sent to all mobile stations, in a similar fashion to the government's requirement to broadcast the notification of the any weather alert on a radio and a television. Where the government requires the notification of the any weather alert to be broadcast to all mobile stations, for example the mobile stations 120 and 125, the mobile stations 120 and 125 do not need to register with the weather alert notification component 105.

In yet another example, the weather alert notification component 105 employs the timer associated with the mobile stations 120 and 125 to determine if either of the mobile stations 120 and 125 are registered to receive notification of the weather alert.

In STEP 320, the weather alert notification component 105 polls the network 115 to determine the respective locations of the mobile stations 120 and 125. In STEP 325, the weather alert notification component 105 compares the Specific Area Message Encoding area to the location of the mobile stations 120 and 125. The weather alert notification component 105 sends the notification to the mobile stations 120 and 125 if the respective locations of the mobile stations 120 and 125 are within the Specific Area Message Encoding area.

In STEP 330, the weather alert notification component 105 evaluates the mobile station 120 to determine if the mobile station 120 supports advanced reporting. For example, the weather alert notification component 105 queries the notification database 110 to determine the features supported by the mobile station 120. In STEP 335, the weather alert notification component 105 issues advanced data to the mobile station 120, if the mobile station 120 supports advanced reporting. In STEP 340, the weather alert notification component 105 determines the advanced mobile station type and provides advanced data to the mobile station 120. In STEP 340, the weather alert notification component

120 provides a detailed map of the Specific Area Message Encoding area of the weather alert to the mobile station 120.

Figure 4:
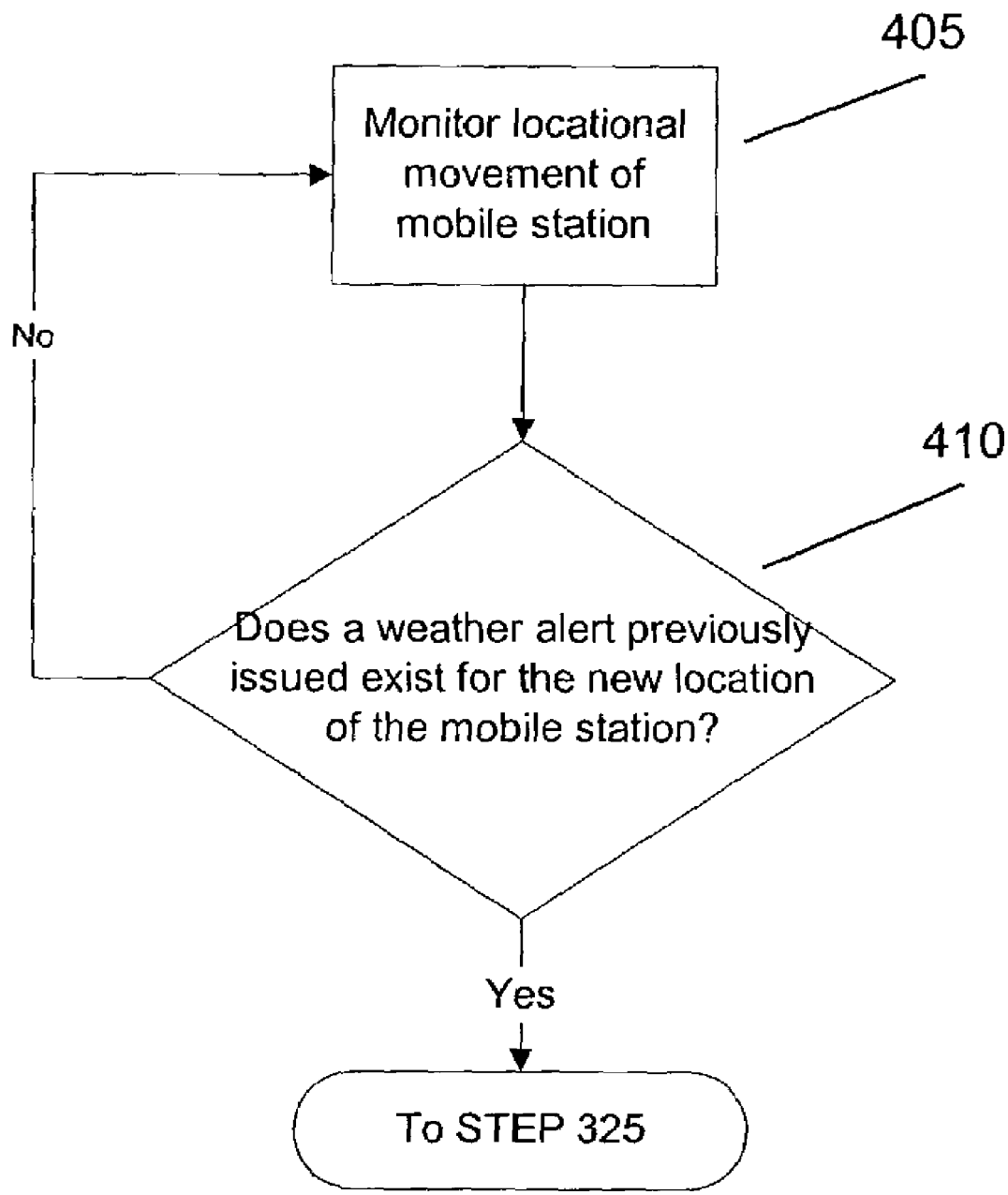
FIG. 4 is a representation of an exemplary process flow of monitoring a location of a mobile station of the one or more mobile stations of the apparatus of FIG. 1.

Referring to FIG. 4, in STEP 405, the weather alert notification component 105 monitors the locational movement of the mobile station 120 by polling the mobile station 120 to receive the new location of the mobile station 120. In STEP 410, the weather alert notification component 105 compares the new location of the mobile station 120 to the Specific Area Message Encoding areas of any weather alerts in the history of the notification database 10 to determine if a weather alert was previously issued for the new location within the Specific Area Message Encoding area. In STEPS 325–345, the weather alert notification component 105 sends a notification of the weather alert previously sent for the new location to the mobile station 120.

The apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 employs at least one computer-readable signal-bearing medium. One example of a computer-readable signal-bearing medium for the apparatus 100 comprises an instance of a recordable data storage medium such as one or more of a magnetic, electrical, optical, biological, and atomic data storage medium. The recordable data storage medium in one example comprises the storage device 101. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network. An exemplary component of the apparatus 100 employs and/or comprises a set and/or series of computer instructions written in or implemented with any of a number of programming languages, as will be appreciated by those skilled in the art. The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising the steps of:
    receiving, at a weather alert notification component, a short message service (SMS) request from a mobile station to receive one or more notifications of any one or more weather alerts that occur during a time period;
    registering the mobile station with the weather alert notification component upon receipt of the SMS request from the mobile station;
    determining a location of the mobile station upon the occurrence of the any one or more weather alerts during the time period;
    sending a notification of a weather alert, of the one or more notifications of the any one or more weather alerts, to the mobile station upon an occurrence of the weather alert during the time period; and
    evaluating a history of weather alerts received by the weather alert notification component to determine if the weather alerts were previously issued for a new location of the mobile station when the mobile station travels from the location to the new location.

2. The method of claim 1, wherein the notification of the weather alert comprises a first notification of a first weather alert, the method further comprising the step of:
    withholding a second notification of a second weather alert from the mobile station upon an occurrence of the second weather alert after the time period.

3. The method of claim 2, wherein the step of withholding the second notification of the second weather alert from the mobile station upon the occurrence of the second weather alert after the time period comprises the step of:
    withholding the second notification of the second weather alert from the mobile station upon expiration of the time period.

4. The method of claim 1, wherein the step of sending the notification of the weather alert, of the one or more notifications of the any one or more weather alerts, to the mobile station upon the occurrence of the weather alert during the time period comprises the steps of:
    evaluating a weather criteria profile associated with the mobile station upon the occurrence of the weather alert during the period of time; and
    sending the notification of the weather alert to the mobile station if the weather alert matches at least one criteria of the weather criteria profile associated with the mobile station.

5. The method of claim 4, wherein the notification of the weather alert comprises a first notification of a first weather alert, the method further comprising the step of:
    withholding from the mobile station a second notification of a second weather alert that fails to match at least one criteria of the weather criteria profile associated with the mobile station.

6. The method of claim 1, further comprising the steps of:
    comparing an area associated with the weather alert to the location of the mobile station; and
    sending the notification of the weather alert to the mobile station if the location of the mobile station is within the area associated with the weather alert.

7. The method of claim 6, wherein the step of determining the location of the mobile station upon the occurrence of the weather alert during the time period comprises the step of:
    polling the mobile station for the location of the mobile station.

8. The method of claim 1, wherein the step of sending the notification of the weather alert, of the one or more notifications of the one or more weather alerts, to the mobile station upon the occurrence of the weather alert during the time period comprises the steps of:
    comparing a time of the occurrence of the weather alert to the time period associated with the mobile station; and
    sending the notification of the weather alert to the mobile station if the occurrence of the weather alert happens during the time period.

9. The method of claim 8, wherein the mobile station comprises a first mobile station, and wherein the time period comprises a first time period, the method further comprising the steps of:
    comparing the time of the occurrence of the weather alert to a second time period associated with a second mobile station; and withholding the notification of the weather alert to the second mobile station if the occurrence of the weather alert happened after the second time period.

10. The method of claim 1, further comprising the step of:
sending the notification of the weather alert to the mobile station upon the occurrence of the weather alert during the time period if the mobile station is registered.

11. The method of claim 10, further comprising the steps of:
unregistering the mobile station upon expiration of the time period; and
withholding the notification of the weather alert to the mobile station if the mobile station is unregistered.

12. An apparatus, comprising:
a weather alert notification component that registers a mobile station to receive a notification of a weather alert during a time period upon receipt of a short message service (SMS) request from the mobile station;
wherein the weather alert notification component comprises a locator component that determines a location of the mobile station upon the occurrence of the weather alert during the time period; and
wherein the weather alert notification component sends the notification of the weather alert to the mobile station upon occurrence of the weather alert during the time period; and
wherein the weather alert notification component evaluates a history of weather alerts received by the weather alert notification component to determine if the weather alerts were previously issued for a new location of the mobile station when the mobile station travels from the location to the new location.

13. The apparatus of claim 12, wherein the weather alert notification component comprises a timer that maintains the time period associated with the mobile station, and wherein the timer is initialized upon receipt of the SMS request from the mobile station.

14. The apparatus of claim 12, wherein the notification of the weather alert comprises a first notification of a first weather alert; and
wherein the weather alert notification component withholds a second notification of a second weather alert from the mobile station upon an occurrence of the second weather alert after the time period.

15. The apparatus of claim 12, wherein the weather alert notification component comprises a registration component that manages a registration status of the mobile station for the time period; and
wherein the registration component serves to register the mobile station for the time period upon receipt of the SMS request from the mobile station; and
wherein the weather alert notification component sends the notification of the weather alert to the mobile station if the mobile station is registered.

16. The apparatus of claim 15, wherein the registration component serves to unregister the mobile station after an expiration of the time period; and
wherein the weather alert notification component withholds the notification of the weather alert from the mobile station if the mobile station is unregistered.

17. The apparatus of claim 15, wherein the weather alert notification component comprises a timer associated with the mobile station; and
wherein upon receipt of the SMS message, the registration component initiates the timer associated with the mobile station, and wherein the registration component unregisters the mobile station upon expiration of the time period.

18. The apparatus of claim 12, wherein the weather alert notification component stores a weather criteria profile established by the mobile station, and wherein the weather criteria profile comprises one or more criteria; and
wherein the weather alert notification component sends the notification of the weather alert to the mobile station if the weather alert matches at least one criteria of the one or more criteria of the weather criteria profile.

19. The apparatus of claim 12, wherein the weather alert notification component sends the notification of the weather alert to the mobile station upon the occurrence of the weather alert during the time period if the location of the mobile station is within an area associated with the weather alert.

20. The apparatus of claim 19, wherein the locator component polls the mobile station to determine the location of the mobile station upon receipt of the weather alert during the time period.

21. The apparatus of claim 20, wherein the weather alert generator comprises the National Weather Service.

22. The apparatus of claim 20, wherein the weather alert generator comprises the National Oceanic and Atmospheric Administration.

23. The apparatus of claim 19, wherein the locator component employs a 911-triangulation to determine the location of the mobile station upon receipt of the weather alert during the time period.

24. The apparatus of claim 19, wherein the area associated with the weather alert comprises a specific area message encoding (SAME) area.

25. The apparatus of claim 12, further comprising a weather alert generator that issues the weather alert to the weather alert notification component.

26. An article, comprising:
one or more computer-readable signal-bearing media;
means in the one or more media for receiving a short message service (SMS) request from a mobile station to receive one or more notifications of any one or more weather alerts that occur during a time period;
means in the one or more media for registering the mobile station with a weather alert notification component upon receipt of the SMS request from the mobile station;
wherein the weather alert notification component comprises a locator component that determines a location of the mobile station upon the occurrence of the any one or more weather alerts during the time period; and
means in the one or more media for sending a notification of a weather alert, of the one or more notifications of the any one or more weather alerts, to the mobile station upon an occurrence of the weather alert during the time period;
wherein the weather alert notification component evaluates a history of weather alerts received by the weather alert notification component to determine if the weather alerts were previously issued for a new location of the mobile station when the mobile station travels from the location to the new location.

* * * * *